United States Patent Office 3,655,796
Patented Apr. 11, 1972

3,655,796
CYCLOALKENYL TRICYCLOALKENES USED TO PRODUCE ELASTOMERS BY COPOLYMERISATION WITH OLEFINES
Yves Amiard, Pau, and Jean-Paul Bellissent, Billere, France, assignors to Societe Anonyme dite: Societe Nationale des Petroles d'Aquitaine, Courbevoie, France
No Drawing. Filed June 16, 1969, Ser. No. 833,696
Claims priority, application France, June 17, 1968, 155,189
Int. Cl. C07c *13/28, 13/54, 13/62*
U.S. Cl. 260—666 PY                12 Claims

ABSTRACT OF THE DISCLOSURE

Cycloalkenyl tricycloalkenes are novel polycyclic compounds which may include substituents such as methyl, ethyl or others. They can be prepared by reacting a substituted or unsubstituted cyclic 1,3-diene with a 2,2'-bicycloalkenyl compound. The cycloalkenyl tricycloalkenes can be used to produce elastomers by copolymerisation with non-conjugated polyenes and/or olefines.

---

The present invention relates to a new series of homologous polycyclic compounds, the cycloalkenyl tricycloalkenes, which can carry various substitutions. It is also concerned with a process for the preparation of these new compounds and with materials produced from them.

These polycyclic compounds of the invention are of very great interest in the production of elastomers by copolymerisation with non-conjugated polyenes and/or olefines. The cycloalkyl tricycloalkenes according to the invention can be represented by the following general formula:

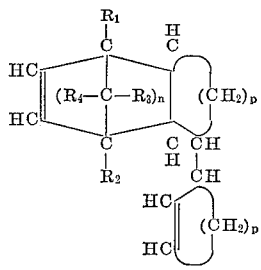

in which each of the radicals $R_1$, $R_2$, $R_3$, $R_4$, which may be the same or different, can be hydrogen, a halogen or a linear or branched alkyl radical having from 1 to 10 carbon atoms, while $n$ can be 1 or 2 and $p$ can be any value from 2 to 5.

Among the preferred compounds of the invention are those for which the symbols $R_1$ to $R_4$ represent hydrogen or relatively light radicals having from 1 to 6 carbon atoms, such as methyl, ethyl, isopropyl and butyl. By way of example, mention may be made of 5-cyclopen-2'-en-yl-tricyclo-$(5,2,1,0^{2,6})$-dec - 8 - ene and its derivatives, 6-cyclohex - 2' - en-yl-tricyclo-$(6,2,1,0^{2,7})$-undec-9-ene and its derivatives, 8-cyclooct - 2' - en-yl-tricyclo-$(8,2,1,0^{2,9})$-tridec - 11 - ene and its derivatives, and 5-cyclopent - 2' - en-yl-tricyclo-$(5,2,2,0^{2,6})$-undec-8-ene.

The invention provides a process for the preparation of the cycloalkenyl tricycloalkenes of the invention which comprises causing the reaction of a cyclic 1,3-diene of the general formula

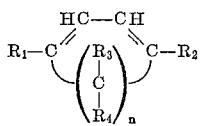

(in which $R_1$ to $R_4$ have the foregoing meanings and $n$ is 1 or 2) with a 2,2' - bicycloalkenyl of the general formula

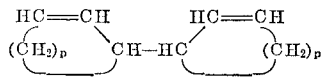

(in which $p$ is 2, 3, 4 or 5), the reaction taking place at temperatures which are between 100° and 500° C., preferably between 150° and 250° C., and at pressures which may be from 1 to 1500 atmospheres.

The reaction can be carried into effect without a solvent, or in the presence of a solvent, which latter can be a hydrocarbon, such as hexane, heptane, cyclohexane, benzene, toluene or others, or an ether, such as dioxane, or tetrahydrofuran. The ratio by weight between the solvent and the reactants in the reaction mixture is generally between 0.5 and 20 to 1.

If the reaction between the cyclic diene and the dicycloalkenyl takes place in the absence of a solvent, a useful feature of the invention consists in using an excess of dienophile with respect to the diene. The molar ratio between the dienophile and diene can vary from 1.1 to 30, but it is preferably between 3 and 12. The dienophile excess is recovered by distillation when the reaction is completed.

The reaction time can vary from 1 to 200 hours, depending on the temperature, but it is preferably between 10 and 40 hours.

It is advantageous for a small proportion of hydroquinone to be added to the reaction mixture; this hydroquinone prevents oxidation of the products.

As the cyclic 1,3-diene which can be used in the reaction according to the invention, cyclopentadiene, 1-methyl cyclopentadiene, 5-methyl cyclopentadiene, cyclohexa-1,3-diene, 5-methyl cyclohexa - 1,3 - diene can be mentioned as preferred examples.

The 2,2'-bicycloalkenyls corresponding to the foregoing formula which can be caused to react with the dienes, include 2,2'-bicyclopentenyl, 2,2'-bicyclohexenyl, 2,2'-bicyclooctenyl and 2,2'-bicycloheptenyl.

A very valuable use of the cycloalkenyl tricycloalkenes according to the invention is in the preparation of elastomers by copolymerisation with non-conjugated polyenes or olefines.

The copolymers obtained are amorphous copolymers of high molecular weight, having a degree of unsaturation which is sufficient for them to be able to undergo the conventional sulphur vulcanisation. These copolymers can also be vulcanised by means of free radical generators.

After vulcanisation, the new copolymers can lead to products having good mechanical properties, particularly breaking strengths, which may be higher than 130 kg./cm.² and elongations at break, which are, for example, in the range between 150% and 300%.

By suitable choice of the tricycloalkenes to be copolymerised and of the polymerisation conditions, it is possible to cause the mechanical characteristics of the resulting elastomers to be varied at will.

The copolymerisation of the cycloalkenyl tricycloalkenes of the invention with the non-conjugated olefine or olefines and/or the non-conjugated polyene or polyenes can be carried out by introducing the olefine or olefines and/or the polyene or polyenes into an organic liquid medium containing at least one of the said tricycloalkenes and an appropriate catalyst system, and by maintaining them all in contact until the formation of copolymers of olefines and/or of polyenes with the said cycloalkenyl tricycloalkene or tricycloalkenes.

Catalyst systems which are quite suitable comprise an organometallic compound (A) of one or more metals of the Groups I, II, or III of the Periodic System and a compound (B) of a transition metal of Groups IV to VIII of the said system. Preference is particularly given to catalyst system containing organo-aluminium compounds which may or may not be halogenated, and vanadium compounds, such as for example halides and oxyhalides of compounds in which at least one of the valencies of the metal is satisfied by a hetero atom, particularly oxygen or nitrogen, bonded to an organic group (e.g. triacetylacetonate). Excellent results are obtained with catalyst systems which contain, for example, vanadium tetrachloride ($VCl_3$) or vanadium oxychloride ($VOCl_3$) and diethylaluminium chloride or ethylaluminium sesquichloride.

The catalyst system can even include a certain proportion of an activator and particularly of an alkoxyalkyl halosulphate or halosulphite, such as ethoxyethyl chlorosulphate or chlorosulphite, etc.; of a halosulphinyl or halosulphonyl thiophene, such as 2-chlorosulphonyl thiophene, 2,4-di-(chlorosulphonyl)thiophene, etc.; of a halogenated derivative of 5,8 - dioxymethylene - Δ - 1,4-hexahydronaphthalene, such as 1,2,3,4,9,9 - hexachloro-5,8-dioxomethylene-Δ-1,4-hexahydronaphthalene, etc.; of a dichloroarylphosphine, such as dichlorophenylphosphine, etc.

In order to form the catalyst system, the compounds (A) and (B) may or may not be mixed before they are introduced into the reactor. The catalyst can thus be preformed and possibly "aged," in order to be introduced continuously or intermittently into the mixture to be polymerised.

The activator, if it is present, can be mixed with the catalyst before being introduced into the reaction mixture; it is also possible for the activator to be directly introduced into the mixture during polymerisation, continuously or in fractions. In another method of procedure, the activator is first of all mixed with the compound or compounds of the transition metal or metals.

The catalyst system includes quantities of compounds (A) and (B) such that the molar ratio between the metal of compound (A) and the transition metal of compound (B) is between 1 and 30 and preferably between 4 and 10.

The quantity of activator which may be present can vary within wide limits. In particular, it is possible to use 0.5 to 25 mols of activator per gram atom of transition metal, but it is however necessary for the reaction medium to contain more of compound (A), expressed as metal, than of activator.

It is understood that other catalyst systems suitable for the polymerisation of olefines can also be employed. It would, for example, be possible to use catalyst systems formed by mixtures of allyl compounds of metals selected from chromium, tungsten, molybdenum or zirconium, with halides, oxyhalides, ester halides or esters of metals selected from titanium, zirconium, vanadium, chromium, molybdenum, tungsten or iron.

The copolymerisation is effected in a suitable solvent, which is preferably formed by an aliphatic, or aromatic hydrocarbon, or cycloalkane, for example, heptane, cyclohexane, benzene, or mixtures of such solvents. Halogenated hydrocarbons which are neutral as regards the catalyst can also be used, for example, chloroform, chlorobenzene, tetrachlorethylene, etc. The olefines can themselves serve as a solvent and the copolymerisation can, for example, be effected in liquid butene and/or propylene.

The copolymerisation can be carried into effect at temperatures which are from −50° to +90° C., but it is preferable to conduct the said copolymerisation at temperatures in the region of 0° C., for example, between −10° and +20° C.

The pressures usually employed during the polymerisation vary from 1 to 10 atmospheres, but it is possible to work under higher pressures.

The proportion of cycloalkenyl tricycloalkene which is added to the olefines is so chosen that the final copolymer contains from 0.1% to 20% by weight of tricycloalkenyl groups.

The tricycloalkene or tricycloalkenes are generally introduced all at once into the reactor before the addition of the catalyst system. It is, however, possible for all or part of these compounds to be introduced during the polymerisation in a continuous or intermittent manner. The copolymerisation can be conducted continuously, and in this case, the solvent, the monomers and the catalyst system are continuously introduced into a polymerisation zone, in amounts such that their time in the said zone is sufficient to obtain the desired concentration of copolymer in the reaction mixture.

When considering the preparation of ethylene/propylene/tricycloalkene copolymers, the lower limit for the ethylene content is not a determining factor, but the upper limit should preferably be 75% by weight in order to avoid a crystallinity of the polyethylene type. As regards the content of alpha-olefines in the amorphous copolymers, this can vary from 5% to 75% by weight. The tricycloalkene content of the copolymer can vary within very wide limits, for example, from 0.1% to 20% by weight, but it is preferable for it to lie between 1% and 10% by weight.

In carrying the copolymerisation reaction into operation, the reaction medium is deprived of free oxygen by the passage of an inert gas, such as nitrogen, argon, etc., before the polymerisation.

The time required for the copolymerisation generally varies with the working conditions and it is usually between 30 minutes and 3 hours.

On completing the operation, the catalyst is destroyed in known manner, and the copolymer is separated from the solvent by coagulation by means of an alcohol, by steam distillation of the solvent or by any other method by which it is possible to separate a polymer from solutions containing it.

The following examples, which are non-limitative illustrate the invention.

EXAMPLE 1

Preparation of the cycloalkenyltricycloalkene 20 g. (0.33 mol) of cyclopentadiene and 122 g. (0.91 mol) of bicyclopentenyl (dienophile/diene ratio=2.7) are introduced into a cylindrical autoclave and 50 mg. of hydroquinone are added. The autoclave is closed and it is heated to 180°–185° C. for 20 hours. The reaction medium is filtered and there are obtained 139 g. of a clear liquid which is distilled under vacuum. Then 98 g. of dicyclopentenyl which has not reacted are eliminated bewteen 42°–44° C./4 mm. Hg. The remainder (i.e. 29.8 g.) distills between 105°–110° C./3 mm. Hg. It is formed of 73% of 5-cyclopen-2'-en-yl-tricyclo(5,2,1,0$^{2.6}$)-dec-8-ene (referred to as compound M) represented by the following formula, the remainder being tricyclopentadiene:

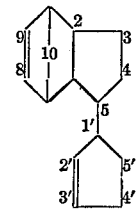

The yields of the product M are 60% with respect to the bicyclopentenyl and 35% with respect to the cyclopentadiene.

The 5 - cyclopent-2'-en-yl-tricyclo-(5,2,1,0$^{2.6}$)-dec-8-ene as thus isolated has the following characteristics:
Boiling point 79–80° C./0.2 mm. Hg.
Refractive index $n_D^{21}$=1.520; density 20° C.
*Microanalysis.*—Found (percent): C, 88.92; H, 10.04. Calculated (percent): C, 90.08; H, 10.08.

Copolymerisation

The tricycloalkene obtained is copolymerised with a mixture of ethylene and propylene.

The polymerisation is effected in a cylindrical glass reactor with an internal diameter of 10 cm. and a capacity of 1000 ml., said reactor being equipped with an agitator, a thermometer, two dropping funnels for the introduction of the catalyst, a condenser with an outlet tube for gases and a gas inlet tube which is terminated near the bottom of the reactor by a ring having several oenings permitting a better diffusion of the gases introduced through the inlet tube. The reactor is immersed in a thermostatically controlled bath in order to maintain its temperature between $-2°$ and $+2°$ C.

Into the reactor, which is kept under a stream of nitrogen, there are introduced 630 ml. of previously dried and degasified n-heptane and 5 g. of 5-cyclopent-2'-en-yl-tricyclo-$(5,2,1.0^{2.6})$-dec-8-ene.

The dropping funnels arranged above the reactor were cleansed and kept under a nitrogen atmosphere. Two millimols of $VOCl_3$ in 60 ml. of anhydrous n-heptane are introduced into one funnel, while 10 millimols of diethylaluminium monochloride $(C_2H_5)_2AlCl$ in 60 ml. of anhydrous n-heptane are introduced into the other funnel.

The supply of nitrogen is stopped and then a mixture of purified propylene and ethylene in a molar ratio of 2:1 is introduced through the gas inlet tube, the mixture circulating at the rate of 99 standard litres per hour. After circulation of the gaseous mixture for 30 minutes, the propylene to ethylene molar ratio is brought to the value of 1 and the constituents of the catalyst are introduced dropwise over a 30 minute period.

The polymerisation is stopped by adding 20 ml. of ethanol 60 minutes after the start of the injection of the catalysts.

The polymer solution is poured into ethanol for coagulating the terpolymer.

After drying this polymer under vacuum at 40° C., there are obtained 29.7 g. of a solid product having the appearance of a non-vulcanised elastomer.

Vulcanisation of the copolymer

Using a cylinder-type mixer, 100 parts by weight of the product which is obtained are mixed with 50 parts of HAF carbon black, 5 parts of zinc oxide, 2 parts of sulphur, one part of mercaptobenzthiazole and 2 parts of tetramethylthiuram disulphide.

The mixture is heated at 160° C. for 60 minutes in a press.

Characteristics of the vulcanised product

Tensile strength—175 kg./cm.$^2$
Elongation at break—190%
Shore A hardness—75
Rebound—50%

EXAMPLE 2

Preparation of the cycloalkenyl tricycloalkene

The same operation as in Example 1 is repeated, but the autoclave is heated to 250°–260° C. After filtering the reaction mixture, 140 g. of a clear liquid are obtained. 100 g. of bicyclopentyl which has not reacted are recovered by distillation. The product which remains is a mixture of 86% of compound M and 14% of tricyclopentadiene.

The yields of M are 45% relatively to the bicyclopentenyl and 25% relatively to the cyclopentadiene.

Copolymerisation

Example 1 is repeated, but in the polymerisation step, the polymerisation is stopped as soon as the catalysts have been completely injected.

19 g. of a solid product are obtained, this having the appearance of an unvulcanised elastomer and containing 73% by weight of ethylene.

The terpolymer is then vulcanised, as in Example 1.

Characteristics of the vulcanised product

Tensile strength—180 kg./cm.$^2$
Elongation at break—170%
Shore A hardness—80
Rebound—53%

EXAMPLE 3

Preparation of the cycloalkenyl tricycloalkene 20 g. (0.33 mol) of cyclopentadiene and 244 g. (1.82 mol) of dicyclopentenyl (dienophile/diene ratio=5.5) and also 100 mg. of hydroquinone are introduced into the autoclave and heated at 180°–185° C. for 20 hours.

After the reaction mixture has been filtered, 258 g. of a clear yellow liquid are obtained. 210 g. of dicyclopentenyl which has not reacted are recovered by distillation, and then 35 g. of a mixture distilling between 105° and 110° C./2.5–3 mm. Hg.

This mixture contains 82% of compound M and 18% of tricyclopentadiene.

The yields of M relatively to the dicyclopentenyl and to the cyclopentadiene are respectively 56% and 47%.

The microanalysis of the isolated product M gives the following results, for the theoretical formula $C_{15}H_{20}$:

Found (percent): C, 90.03; H, 10.17. Calculated (percent): C, 90.08; H, 10.08.

Copolymerisation

Example 1 is repeated, except for the introduction into the reactor of 600 ml. of anhydrous n-heptane instead of 630 ml., and for the fact that the 5-cyclopent-2'-en-yl-tricyclo-$(5,2,1,0^{2,6})$-dec-8-ene is mixed with aluminium diethylmonochloride in 90 ml. of anhydrous n-heptane, the mixture being placed in one of the dropping funnels arraged above the reactor.

The polymerisation is stopped 40 minutes after beginning the injection of the catalysts.

27 g. of an elastomer are obtained and this is then vulcanised according to the conditions of Example 1.

Characteristics of the vulcanised product

Tensile strength—210 kg./cm.$^2$
Elongation at break—260%
Shore A hardness—73
Rebound—53%

EXAMPLE 4

Preparation of the tricycloalkene 20 g. (0.33 mol) of cyclopentadiene, 366 g. (2.73 mols) of bicyclopentenyl (dienophile/diene ratio=8.2) and 50 mg. of hydroquinone are introduced into the autoclave.

The mixture is heated at 180°–185° C. for 20 hours.

After the reaction mixture has been filtered, 376 g. of a clear liquid are obtained. By distillation, 330 g. of unreacted bicyclopentenyl are recovered and also 41 g. of a mixture containing 75% of 5-dicyclopent-2'-en-yl-tricyclo-$(5,2,1,0^{2,6})$-dec-8-ene (compound M) and 25% of tricyclopentadiene.

The yields of M relatively to the bicyclopentenyl and to the cyclopentadiene are respectively 57% and 52%.

Copolymerisation

The operating procedure described in Example 1 is repeated, but replacing the heptane by benzene and using, as the catalyst system, 1.5 millimols of $VCl_4$ and 12 millimols of ethylaluminium sesquichloride of formula $\frac{1}{2}[(C_2H_5)_3Al_2Cl_3]$.

The saturation of the solvent by the propylene-ethylene mixture is effected in 20 minutes instead of 30 minutes.

The polymerisation is stopped as soon as the catalysts have been completely injected.

In this way, 28.8 g. of terpolymer comprising 62% by weight of ethylene are obtained.

The terpolymer is then vulcanised as in Example 1.

Characteristics of the vulcanised product

Tensile strength—160 kg./cm.$^2$
Elongation at break—190%
Shore A hardness—75
Rebound—49%

We claim:

1. A polycyclic hydrocarbon compound of the general formula:

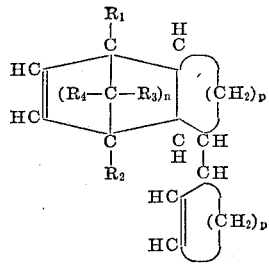

in which $R_1$, $R_2$, $R_3$, $R_4$ are individually selected from the group consisting of hydrogen, and alkyl radicals having from 1 to 10 carbon atoms, wherein $n$ is a number selected from 1 and 2 and $p$ is a number selected from the integral values 2, 3, 4 and 5.

2. 5 - cyclopent - 2' - en - yl - tricyclo - (5,2,1,0$^{2,6}$)- dec-8-ene.

3. A process for the preparation of the compound of claim 1 which comprises reacting a cyclic 1,3-diene of the formula:

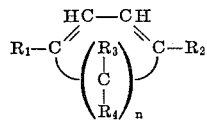

wherein $R_1$, $R_2$, $R_3$ and $R_4$ are individually selected from the group consisting of hydrogen and alkyl radicals having from 1 to 12 carbon atoms, and $n$ is 1 or 2, with a 2,2'-bicycloalkenyl of the formula

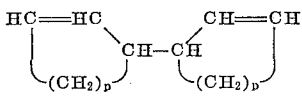

in which $p$ is an integer selected from 2, 3, 4 and 5, the reaction being carried out at a temperature from 100° C. to 500° C.

4. A process according to claim 3, wherein the diene is cyclopentadiene.

5. A process according to claim 4, wherein the 2,2'-dicycloalkenyl is 2,2'-bicyclopentenyl.

6. A process according to claim 3, wherein the dienophile/diene molar ratio being between 1.1 and 30.

7. A process according to claim 3, wherein the reaction takes place in an inert organic solvent selected from the group consisting of hydrocarbons and ethers, and the ratio by weight between the solvent and reactants being between 0.5 and 20.

8. A process according to claim 3, wherein the reaction is carried out at a temperature which is between 150° and 250° C.

9. A process according to claim 3, wherein the reaction mixture contains a small quantity of hydroquinone.

10. A process according to claim 3, wherein the diene is selected from the group consisting of cyclopentadiene, methyl cyclopentadiene, cyclohexa-1,3-diene, and methyl cyclohexa-1,3-diene.

11. A process according to claim 3, wherein the bicycloalkenyl is selected from the group consisting of 2,2'-bicyclopentenyl, 2,2'-bicyclohexenyl, 2,2'-bicyclooctenyl and 2,2'-bicycloheptenyl.

12. A compound according to claim 1, wherein $R_1$, $R_2$ $R_3$ and $R_4$ are individually selected from the group consisting of hydrogen and alkyl radicals having from 1 to 6 carbon atoms.

References Cited

UNITED STATES PATENTS 3,214,483 10/1965 Cripps _____ 260—666 PY
2,960,541 11/1960 Elam et al. _____ 260—666 PY DELBERT E. GANTZ, Primary Examiner V. O'KEEFE, Assistant Examiner U.S. Cl. X.R.
260—80.78, 88.2

PO-1050
(5/69)

UNITED STATES PATENT OFFICE
CERTIFICATE OF CORRECTION

Patent No. 3,655,796          Dated April 11, 1972

Inventor(s) Yves Amiard et al

It is certified that error appears in the above-identified patent and that said Letters Patent are hereby corrected as shown below:

Column 2, line 19, for "di-" read -- bi- --.
    Column 4, line 52, for "dicyclopentenyl" read -- bicyclopentenyl --; line 73, for "1.520" read -- 1.5220 --.
    Column 5, line 10, for "oenings" read -- openings --; line 18, for "5,2,1.0$^{2.6}$" read -- 5,2,1,0$^{2.6}$ --.
    Column 6, line 15, for "dicyclopentenyl" read -- bicyclopentenyl --; line 19, for "dicyclo-" read -- bicyclo- --; line 25, for "dicyclopentenyl" read -- bycyclopentenyl --.
    Column 8, line 1, for "12" read -- 10 --; line 13, for "dicycloalkenyl" read -- bicycloalkenyl --.

Signed and sealed this 21st day of November 1972.

(SEAL)
Attest:

EDWARD M. FLETCHER, JR.
Attesting Officer

ROBERT GOTTSCHALK
Commissioner of Patents